US012577013B2

(12) United States Patent　　　(10) Patent No.:　US 12,577,013 B2
Feilloley et al.　　　　　　　　　　(45) Date of Patent:　　Mar. 17, 2026

(54) METHOD FOR THE PRODUCTION OF A SERIES OF CONTAINERS COMPRISING A STEP FOR MARKING CONTAINERS

(71) Applicant: SIDEL PARTICIPATIONS, Octeville-sur-Mer (FR)

(72) Inventors: Franck Feilloley, Octeville-sur-Mer (FR); Laurent Danel, Octeville-sur-Mer (FR); Stéphane Linglet, Octeville-sur-Mer (FR); Yves-Alban Duclos, Octeville-sur-Mer (FR); Christophe Maran, Octeville-sur-Mer (FR); Sébastien Moulin, Octeville-sur-Mer (FR); Cyrille Lecanu, Octeville-sur-Mer (FR); David Gariou, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 18/355,875

(22) Filed: Jul. 20, 2023

(65) Prior Publication Data

US 2023/0356873 A1　　Nov. 9, 2023

Related U.S. Application Data

(62) Division of application No. 17/318,733, filed on May 12, 2021, now Pat. No. 11,753,198, which is a
(Continued)

(30) Foreign Application Priority Data

Jul. 31, 2017　(FR) ...................................... 1757283

(51) Int. Cl.
B65B 61/02　　　(2006.01)
B29C 49/24　　　(2006.01)
(Continued)

(52) U.S. Cl.
CPC ............ B65B 61/025 (2013.01); B29C 49/24 (2013.01); B29C 49/46 (2013.01);
(Continued)

(58) Field of Classification Search
CPC ........ B29K 2067/003; B67C 2007/006; B67C 2007/0066; B67C 7/004; B65C 3/06;
(Continued)

(56) References Cited

U.S. PATENT DOCUMENTS 9,375,878 B2 * 6/2016 Hahn ........................ B65C 9/40
9,737,909 B2　8/2017 Duclos et al.
(Continued)

FOREIGN PATENT DOCUMENTS

CN　　　1773667　　　5/2006
CN　　101615026　　12/2009
(Continued)

OTHER PUBLICATIONS

FR Search Report, dated Apr. 19, 2018, from corresponding FR 1757283 application.
(Continued)

*Primary Examiner* — Himchan Song
(74) *Attorney, Agent, or Firm* — Blake T. Hudson; Stephanie L. Davy-Jow

(57)　　　　　ABSTRACT

Method for the production of containers from a series of plastic preforms heated in a container production facility having at least one heating station, a forming machine with a number of forming stations, one or more treatment machines with a number of treatment stations. The method includes: forming the preforms in the forming machine; treating the individual containers in the treatment machine; and circulating each container held individually between the forming machine and the treatment machine(s). The method also includes individual identification of each container that
(Continued)

Figure 1:
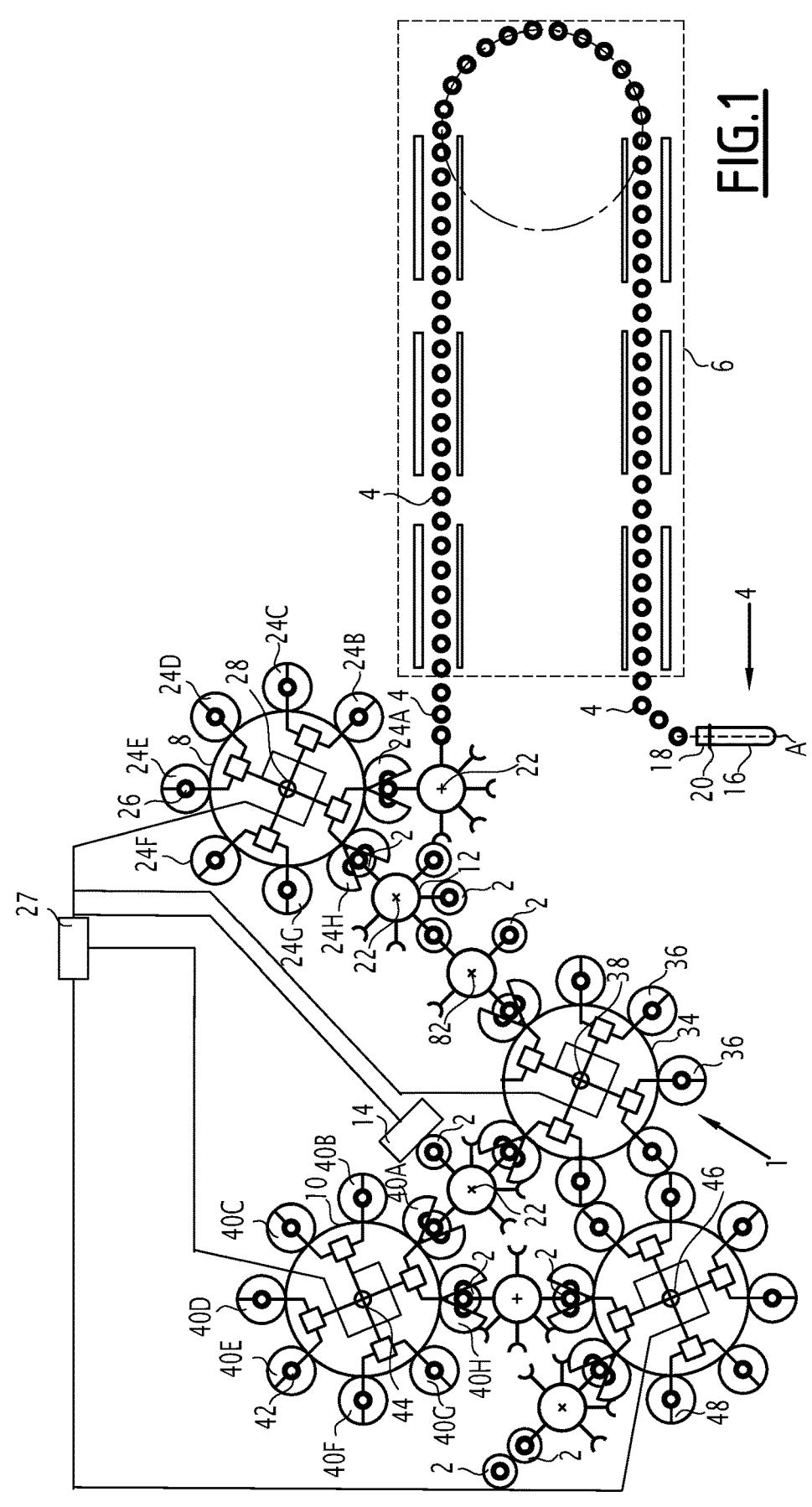

is produced during a predetermined tracking period, an individual identification phase including a marking step during which each individual container that is produced during the tracking period receives a marking that matches the container, making it possible to identify individually the container by distinguishing it from all of the other containers produced by the production facility during the tracking period.

20 Claims, 2 Drawing Sheets

Related U.S. Application Data division of application No. 16/045,885, filed on Jul. 26, 2018, now abandoned.

(51) Int. Cl.

| | |
|---|---|
| *B29C 49/46* | (2006.01) |
| *B29C 49/64* | (2006.01) |
| *B29C 49/78* | (2006.01) |
| *B65C 3/06* | (2006.01) |
| *B67C 7/00* | (2006.01) |
| *B29C 49/06* | (2006.01) |
| *B29C 49/36* | (2006.01) |
| *B29K 67/00* | (2006.01) |
| *B29L 31/00* | (2006.01) |

(52) U.S. Cl.
CPC .......... *B29C 49/6418* (2013.01); *B29C 49/78* (2013.01); *B65C 3/06* (2013.01); *B67C 7/004* (2013.01); *B29C 49/06* (2013.01); *B29C 2049/2404* (2013.01); *B29C 49/36* (2013.01); *B29C 2049/4664* (2013.01); *B29K 2067/003* (2013.01); *B29L 2031/7158* (2013.01); *B67C 2007/006* (2013.01); *B67C 2007/0066* (2013.01)

(58) Field of Classification Search
CPC ..... B29C 49/6418; B29C 49/78; B29C 49/46; B65B 61/025
See application file for complete search history.

(56) References Cited

U.S. PATENT DOCUMENTS

| | | | | | |
|---|---|---|---|---|---|
| 2008/0271809 | A1* | 11/2008 | Goldman | ............. | B67D 1/0041 |
| | | | | | 141/9 |
| 2011/0056172 | A1* | 3/2011 | Klenk | ............... | B29C 49/42069 |
| | | | | | 414/222.01 |
| 2012/0085071 | A1* | 4/2012 | Hahn | ........................ | B65C 9/40 |
| | | | | | 53/425 |
| 2014/0043421 | A1* | 2/2014 | Lindner | ................ | B07C 5/3408 |
| | | | | | 347/106 |
| 2014/0103064 | A1* | 4/2014 | Bruna | ............... | A61M 15/0051 |
| | | | | | 222/23 |

FOREIGN PATENT DOCUMENTS

| | | |
|---|---|---|
| CN | 106983509 | 7/2017 |
| DE | 10 2008 029168 A1 | 12/2009 |
| FR | 2 907 351 A1 | 4/2008 |

OTHER PUBLICATIONS

CN App. No. 201810844618.4, Office Action dated Apr. 28, 2021.
CN App. No. 201810844618.4, Office Action dated Apr. 28, 2021, English translation.

\* cited by examiner

METHOD FOR THE PRODUCTION OF A SERIES OF CONTAINERS COMPRISING A STEP FOR MARKING CONTAINERS

CROSS-REFERENCE TO RELATED APPLICATIONS

This application is a divisional application of U.S. application Ser. No. 17/318,733, filed on May 12, 2021, which is a divisional application of U.S. application Ser. No. 16/045, 885, filed on Jul. 26, 2018. This application also claims priority to French provisional application serial number 1757283 filed on Jul. 31, 2017, each which are entirely incorporated herein by reference.

The invention relates to the field of the production of containers (in particular bottles, flasks) by forming from preforms made of plastic material, such as, for example, polyethylene terephthalate (PET), with the containers being filled with a filler product.

In such a facility, the forming of containers from preforms and a treatment series of these containers are combined in the continuation of the production of containers, such as filling, capping. It is also known to label and/or to mark the container on line.

During the use of the production facility, certain malfunctions are likely to occur and result in, for example, misshapen containers, destroyed containers, or leaks during filling. To detect the defective containers, it is known to provide various sensors in the facility, for example cameras or the like, and it is provided to evacuate the sub-standard containers from the facility so that they are not filled with the filler product.

However, such means do not make it possible to work back to the cause of the malfunction nor to detect other problems that may occur in the facility, for example during filling or in particular units of the facility. Actually, the sensors make it possible to detect a defective container but the analysis of the cause of this fault remains difficult.

To overcome this drawback, it is possible, for example, to provide that the container is marked by each element of the facility that makes possible its forming, its filling and all of the treatments that it is likely to undergo so as to make it possible to trace the path of the container in the facility. However, the multiplicity of the markings makes complications for the facility and is likely to weaken the container by increasing the marked zones of the container. In addition, even by adding several markings, it is not possible to identify each container in a unique way, since several containers that pass through the same elements of the facility will have an identical marking.

The invention relates in particular to container production facilities that ensure a series of treatments on each container and that individually hold each container during the entire treatment process of the container in the production facility. Such facilities have a monitoring system that can record in real time the values that are measured or detected by a large number of sensors of the machine, can record the beginning of a large number of operations carried out on the container and can relate to each container a large amount of machine data relative to each individual container.

However, the analysis of a fault in the container may necessitate testing this container after the latter has left the facility. For example, when the facility comprises the deposition of a layer on a surface of the container, it may be useful to initiate a long manual test that cannot be carried out on line at the production rate. Sometimes, the pertinent test for detecting an origin of a fault can be a test that destroys the container. Problems arise when, after the container has left the facility, the link to the monitoring system of the facility is broken. It is difficult to make the connection between the result of an "off-line" test and the record of what the production facility has done on this particular container.

One of the objects of the invention is to propose a method for production of a series of containers, making it possible to broaden the analysis of the faults and/or the deviations that can occur at a container production facility.

For this purpose, the invention relates to a method for the production of a series of containers from a series of preforms made of plastic materials that are heated in a container production facility comprising at least one station for heating the series of preforms, a forming machine that comprises a number of forming stations, one or more treatment machines that each comprise a number of treatment stations, with the method comprising the following steps:

Circulation of the series of preforms in the heating station up to the forming machine during which each preform is held individually and heated at a reference temperature, Forming of the series of preforms in the forming machine, each heated preform being placed in a forming station in which said preform is formed into a container, in such a way that said series of preforms is formed into a series of individual containers, Treatment of the series of individual containers in the treatment machine, each individual container being placed in a treatment station, Circulation of each container that is held individually between the forming machine and the treatment machine(s), with the method comprising a phase for individual identification of each container that is produced during a predetermined tracking period, an individual identification phase comprising a marking step during which each individual container produced during said tracking period receives a marking that matches said container, making it possible to identify individually said container by distinguishing it from all of the other containers produced by the production facility during said tracking period.

Owing to the individual identification that matches each container that is produced, it is possible to make the connection between measurements made a posteriori after the production of the container and all of the machine data relative to the production of this particular container. This to improve the ability to analyze faults and/or predictive maintenance of the facility.

The forming and treatment stations hold the preform or the container that is placed there. Thus, the container production facility ensures the individual holding of the preform or the container throughout the production process of this container.

The predetermined tracking period can be contractual and cover the entire life of the production facility. Alternatively, it can be selected by the operator and target a particular investigation phase of the facility.

According to another characteristic of the method according to the invention, the marking that matches the container that is to be identified comprises station information relative to at least one of the elements that have held, or should hold, said container that is to be identified during the production of the container that is to be identified, and time-stamping information relative to the moment when said container that is to be identified is marked.

Owing to the fact that preforms and containers are held individually during their entire passages into the production facility, it is possible to know at each moment the position of each preform or container in the facility and thus to identify the various stations through which a preform and then the container that is formed from this preform pass. Thus, in a unique marking step, it is possible to add to the marking information on the stations through which the container has passed. Thus, the container is not weakened by increasing the number of the marking steps and zones. In addition, owing to the time-stamping information at the moment of marking, it is possible to identify each container in a unique way. Actually, the markings of two containers that have passed through the same stations of the production facility will be distinguished from one another by the information at the moment in which the marking has taken place.

Advantageously, the time-stamping information comprises the date and the time to within one second when the marking of the container took place.

The inventors noted that time-stamping information to within one second is adequate for identifying each container in a unique way. Actually, the production cycles of the facility are such that two containers cannot pass through the same stations within the same second. Thus, time-stamping to within one second makes it possible to distinguish two containers from one another, even if the latter have passed through the same stations.

According to a variant, the marking that matches the container that is to be identified comprises a chronology number of the production of the container during the tracking period. Chronology number is defined as any series of alphanumeric codes or the like that can be classified according to an order, in such a way that the order of the markings corresponds to the order of production of the containers.

According to an embodiment, the marking that matches the container that is to be identified also comprises a coding that matches the facility that has produced said container and/or a coding of the tracking period. Such an embodiment can make it possible to identify a container that is produced according to this method by distinguishing it from all of the others, optionally produced by another machine. Thus, the marking can be used as a basis for detecting duties.

According to another characteristic of the method according to the invention, one of said treatment machines is a machine for application of said barrier layer to the inner wall of the container that comprises a number of application stations, with the method comprising a step for application of a barrier layer to the series of containers, each container being placed in an identified application station in which a barrier layer is applied to the inner wall of said container, with the marking step of the container that is to be identified comprising the marking of information relative to the identified application station in which a barrier layer has been or will be applied to said container.

The identification of the station that has carried out the application of the barrier layer is particularly useful for the off-line monitoring of permeability. Actually, the barrier layer makes it possible to improve the impermeability to gas of the container, for example for preventing carbon dioxide ($CO_2$) from escaping from the container through the wall of the latter when the container contains a carbonated product or for preventing the oxidation by ambient air of a product that is contained in the container. So as to evaluate the quality of the barrier layer, it is necessary to carry out permeability tests outside of the facility, and it is therefore useful to identify in a specific way the application station that produced the barrier layer in the tested container.

According to other characteristics of the method according to the invention:

The method comprises another treatment step that is a step for filling each container that is produced, with one of the corresponding treatment machines being a filling machine, the step for marking the container that is to be identified taking place between the step for application of a barrier layer and the filling step.

The facility comprises a capping unit that comprises a number of capping stations; method in which, during the capping step of the series of containers, each container is placed in an identified capping station in which a cap is attached to said container, with the marking step of the container that is to be identified comprising the marking of information relative to the identified capping station in which a cap has been attached to said container.

The marking step comprises the marking of a piece of product information pertaining to the filler product that is introduced into the container during the filling step.

The production facility comprises a labeling unit that has a number of labeling stations; method in which, during the labeling step, each container is placed in an identified labeling station in which a label is attached to said container, with the marking step of the container that is to be identified comprising the marking of information relative to the identified labeling station in which a label has been attached to said container.

As indicated above, the positive transport of the preforms and containers makes it possible to identify easily each of the stations through which a preform and then the container, obtained from this preform, pass. Thus, it is possible to add during the marking the information relative to these stations so as to improve the traceability of the container.

The marking step can also be used to mark usual information on the filler product that is contained in the container, such as, for example, an expiration date or the like. Thus, a single marking step makes it possible to print information relative to the traceability of the container and relative to the product that is contained in the container.

According to another characteristic of the method according to the invention, the marking of each container is carried out in a unique zone of said container, with the information relative to the identified stations and the time-stamping stations being placed adjacent to one another in said unique zone.

By providing a unique marking zone, the risks of damage to the containers are limited, and the reading of information marked on the container is simplified.

According to another aspect, the invention relates to a production facility's method for controlling a series of containers from a series of preforms made of plastic materials comprising:

A first step of machine data acquisition implementing the above-cited method, in which for each individual container that is produced, the control console records, on the one hand, the marking that matches said container, and, on the other hand, a series of specific data relative to the forming and/or treatment stations and/or relative to the elements that have held said container during its production, and/or a series of general data relative to the operation of the facility during the production of said container, A second step of container data acquisition, during which one or more physical values of each of the individually identified containers is/are measured during the first step, A third step of compiling a mixed database that matches, for each individually identified container during the first step, on the one hand, the measurement(s) of the second step, and the series of data acquired during the first step.

According to an embodiment, the control method comprises a diagnostic step, during which the container data are compared against pre-set target values corresponding to measured values, and a detected or imminent malfunction at one or more of the forming and/or treatment stations and/or holding elements of the facility is determined. The detection of an imminent fault can be detected by measuring a derivative of a container datum and/or a machine datum and by detecting that this derivative exceeds a pre-set threshold.

According to another embodiment, the control method comprises a step for analysis of the mixed database, during which at least one law of correlation between the container data and the machine data is established, and a correction step in which according to the correlation law(s), one or more likely adjusted machine parameters is/are calculated during the next production cycle for producing containers, one or more physical values of which will be closer to the pre-set target(s) than during the first step.

According to another aspect of the invention, the facility for production of a series of containers from a series of preforms made of heated plastic materials making it possible to implement an above-mentioned production method, with said facility comprising:

A station for heating the series of preforms making it possible to hold and to heat each of said preforms at a reference temperature, A machine for forming the series of preforms into a series of containers, with said forming machine comprising a number of identified forming stations, each forming station receiving a preform and forming said preform into a container, At least one machine for treatment of the series of containers, with said treatment machine comprising a number of stations for treatment of the container that is produced, A positive transport device that holds each container individually between the forming machine and the treatment machine(s), A marking unit that applies a marking to each of the containers of the series of containers, and a control console that is connected to the marking unit and that generates the marking that is to be applied, with said production facility being characterized in that the control console comprises software that is designed so that said marking matches said container and makes it possible to identify individually each container that is produced during a predetermined tracking period by distinguishing it from all of the other containers that are produced by the production facility during said tracking period.

According to an embodiment, each preform that circulates in the heating station is held by a gripping element; each individual container in the process of forming is held by the forming station that forms it; each individual container in the course of treatment is held by the treatment station that treats it; each individual container that circulates between the forming machine and the treatment machine(s) is held by an element for gripping the positive transport device; said gripping elements, the forming station or the each treatment machine constitute elements that have held, or that should hold, the container that is to be identified, on which information is recorded in the control console that is associated with the marking that matches the container that is to be identified.

The invention is particularly advantageous in the case where the stations of the various machines are "paired," i.e., the two stations of two different machines operate cooperatively to treat a preform and the container that is obtained from the preform. In other words, the containers that are formed from preforms that were passed through a particular forming station of the forming machine will always be filled by the same filling station of the filling station. Thus, the path is known that is followed by a preform and a container that is obtained from the preform as soon as the forming station through which the preform passes is known. Consequently, the marking is simplified since the information that is marked on two containers that have passed through the same stations are identical except for the time-stamping information.

According to an embodiment, one of the treatment machines is a machine for filling the container that is produced by the facility, with the filling machine comprising a number of filling stations, and in which each filling station of the filling machine is combined with an identified forming station of the forming machine in such a way that for each filling station, the control console knows from which forming station the container that the filling station is in the process of filling systematically comes.

Figure 2:
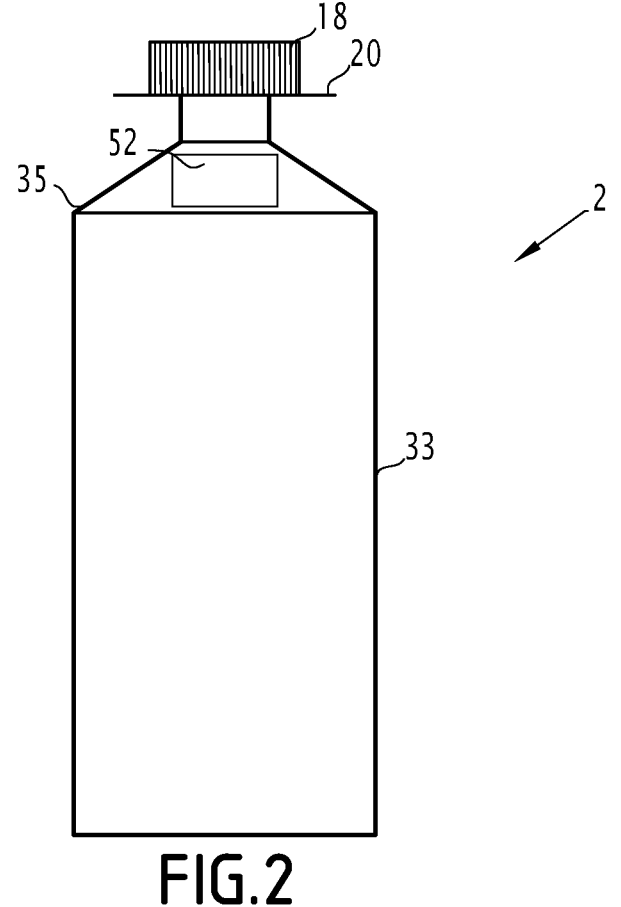
Figure 3:
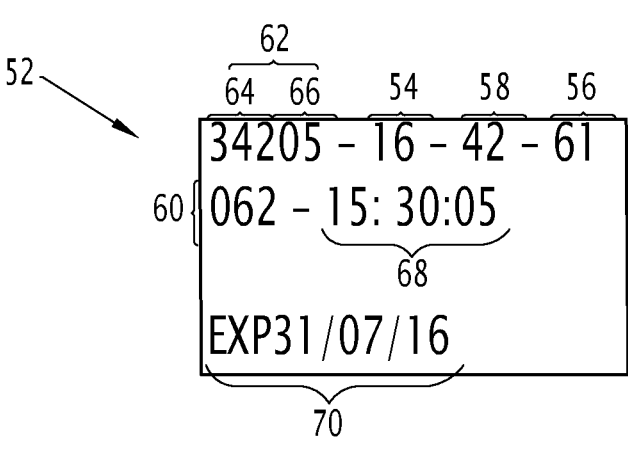
Figure 4A:
Figure 4B:

Other aspects and advantages of the invention will become clear from reading the following description, provided by way of example and given with reference to the accompanying drawings, in which:

FIG. 1 is a diagrammatic top representation of a production facility according to the invention, FIG. 2 is a diagrammatic representation of a container that is obtained after the marking step of the production method according to the invention, FIG. 3 is a representation of the information marked on a container after the marking step of the production method according to the invention, and FIGS. 4a, 4b illustrate two marking examples, a QR code (FIG. 4a), and a data matrix (FIG. 4b).

With reference to FIG. 1, a facility 1 for production of a series of containers 2 from a series of preforms 4 made of plastic material is described.

The production facility 1 comprises at least one heating station 6, a forming machine 8, a filling machine 10, a transport device 12, and a marking unit 14.

Each preform 4 comprises a body 16, a neck 18, and a ring 20. The body 6 has, for example, the shape of a test tube with a closed bottom and defines an inner volume that extends along a main axis A. The neck 8 extends in the continuation of the body 6 opposite the bottom and forms an upper opening through which a fluid can be introduced into the inner volume of the preform, as will be described later. The neck 8 of the preform has, for example, the definitive shape that it will have in the container 2 that is formed from the preform 4 and comprises, for example, a threading on its outer wall to make it possible to attach a cap to the container. The ring 10 extends between the body 6 and the neck 8 radially toward the outside and forms, for example, a transport ring by which the preform can be gripped and transported, as will be described subsequently. The form of the preform that is provided above is only by way of example, and other forms could be considered, as long as the latter are appropriate for forming a container by introduction of a fluid into the preform. Thus, by way of example, the preform could have a smooth neck, be lacking a ring, and/or have other form variants according to various preform models that can be used in the production facility 1. The plastic material of the preform is, for example, polyethylene terephthalate (PET). As a variant, the plastic material could be different from PET, as long as this material is able to be made malleable and deformable to make possible the production of a container by introduction of a fluid into the preform.

The heating station 6 is arranged to heat each preform 4 at a reference temperature at which the preform 4 is in a malleable state and can be formed into a container. The reference temperature is between the glass transition temperature and the crystallization temperature of the material of the preform 4. The heating station 6 comprises, for example, a number of heating elements that are distributed in the heating station 6 along a path and arranged to heat the series of preforms 4 that move before the heating elements owing to the transport device 12. The heating elements are, for example, in addition distributed in a direction that is parallel to the axes of the preforms in such a way as to make it possible to heat the entire body 6 of the preforms 4. With such a heating station 6, or moving furnace, being known in the art, it will not be described in more detail here.

At the outlet of the heating station 6, the heated preforms are moved to the forming machine 8 by the transport device 12.

The transport device 12 is formed by, for example, a conveyor in the heating station 6. At the outlet of the heating station 6, the transport device 12 is, for example, formed by a number of transfer wheels 22 that can rotate, each provided on the periphery with a number of gripping elements. Each gripping element, for example of the clamp type or the like, is arranged to grip a preform 4 from the series of preforms and to transport it to the next wheel where an element for gripping the next wheel removes the preform and so on up to the forming machine 8. The number of wheels can vary from one production facility to the next and depends on the arrangement of the production facility. A single wheel could be provided between the outlet of the heating station 6 and the forming machine 8, as shown in FIG. 1.

The transport device 12 is a positive transport device, i.e., the transport device 12 is arranged so that the position of a preform 4 is always known in the production facility 1. This can be achieved in particular by driving one or more wheels in rotation by means of a synchronous motor and by slaving the rotation of the other wheels to the wheel that is driven in rotation by the synchronous motor, for example by means of belts. Another approach consists in driving in rotation each wheel by means of a synchronous motor. Actually, the angular position of a synchronous motor is known at any moment, and it is therefore possible to deduce from it the position of a preform 4 in the production facility using the knowledge of the angular position of the wheels at each moment.

The forming machine 8 comprises a number of forming stations 24 that are each arranged to receive and form a preform 4 from the series of preforms 4 into a container. For this purpose, each forming station 24 comprises a mold 26 and a device for injecting a forming fluid. The mold 26 comprises a molding cavity that has the shape of the container that is to be produced and arranged to receive the body 6 of the preform. The injection device is arranged to inject a forming fluid under pressure into the inner volume of the preform 4 through the upper opening of the latter so that the body 6 of the preform acquires the shape of the molding cavity. The forming fluid is, for example, a gas, for example pressurized air. Each forming station 24 can also comprise a stretching rod that is arranged to provide support on the bottom of the preform 6 so as to extend it along its axis.

Each forming station 24 is identified, i.e., it is referenced in a control console 27 of the facility. Thus, by way of example, the forming machine 8 comprises 28 forming stations. For reasons of simplicity and to facilitate the reading of the figure, only five forming stations 24A, 24B, 24C, 24D and 24E. The forming stations 24 are carried by a forming wheel 28 or carrousel that can rotate around an axis of rotation that is parallel to the axes of rotation of the transfer wheels 22. The forming stations 24 are carried on the periphery of the forming wheel 28 in such a way that they move along a circular path that is defined by the forming wheel 28 between an entry point 30 and an exit point 32. At the entry point, the mold is open and is arranged to receive a preform 4 from the transfer wheel 22, and then the mold 26 is closed, the injection device is put into fluidic communication with the inner volume of the preform, and the forming fluid is injected into the preform while it is moving from the forming station between the entry point 30 and the exit point 32. At the exit point 32, the mold 26 is open and the formed container is extracted from the forming station 24. The structure and the operation of such forming stations 24 and, more generally, the forming machine 8 are known as such and will not be described in more detail here.

It should be noted that in the forming machine 8, the transport device 12 is formed by the forming wheel 28 and the molds themselves that transport the preforms and the containers from the entry point 30 to the exit point 32. The forming wheel 28 is thus driven in such a way as to know the positions of the forming stations 24 at any moment, for example by driving the forming wheel 28 by means of a synchronous motor. Consequently, the facility makes it possible to know in what forming station 24 a preform 4 is placed and formed into a container. The control console 27 thus records into which forming station 24A, 24B, ... , 24E a particular preform passes.

At the exit point 32 of the forming machine 8, the transport device 12 comprises a transfer wheel that is arranged to remove the containers 2 at the outlet of the forming machine 8 and to transfer them to the filling machine 10.

The containers that are obtained, one example of which is shown in FIG. 2, comprise a body 33 that is obtained by forming the body 16 of the preform, a neck 18 and a ring 20 that are identical to the neck 18 and to the ring 20 of the preform 4 since the latter are not modified during the forming. The body 33 comprises, for example, a shoulder 35 that forms the connection between the neck 18 and a cylindrical part of the body of the container 2.

According to variant embodiments of the production facility, one or more units 34 for treatment of the series of containers 2 can be provided between the forming machine 8 and the filling machine 10. Each treatment unit 34 comprises a number of identified treatment stations 36 that are arranged to apply a particular treatment to the containers 2 from the series of containers and are carried by, for example, a handling wheel 38. As for the forming machine 8, in the treatment unit 34, the transport device 12 is formed by the handling wheel 38, and the treatment stations 36 themselves and the handling wheel 38 are arranged in such a way that it is known by which identified treatment station 36 a container 2 from the series of containers is treated. The control console 27 thus records into which treatment station a particular container passes.

The transport device 12 is also arranged to transfer the containers 2 between the exit points of a treatment unit 34 to the entry point of another treatment unit 34 and up to the filling machine 10. It should be noted that the transfer wheels 22 of the transfer device can also make it possible in a known way to modify the span between two successive preforms 4 or containers 2 to adapt this span to the number of treatment stations 36 provided in the treatment units 34. Actually, the forming machine 8, the filling machine 10, and the various treatment units 34 do not necessarily comprise the same number of stations, this number of stations depending on the amount of space required by the latter on a wheel and on the handling rate of the stations. Actually, the stations should make it possible to carry out the handling in one turn of the handling wheel. The gripping elements of the transport device 12 are, for example, adapted for transporting the containers 2 by their rings 20.

By way of example, the treatment unit 34 can be a labeling unit that makes it possible to label each container 2, i.e., to apply a label on each container. For this purpose, the labeling unit comprises a number of identified labeling stations that are each arranged to receive a container and to apply a label on said container. The labeling stations are, for example, carried by a labeling wheel that can rotate and that moves the containers in a positive way between an entry point and an exit point, with the labels being applied to the containers during this movement.

As a variant or in addition, the treatment unit 34 or another treatment unit can be a unit for application of a barrier layer on the inner wall of the containers 2. The application unit comprises a number of application stations that are each arranged to apply a barrier layer on the inner wall of a container 2 that is received into said application station. Such an application station is described in, for example, the document FR-2 907 351. The application stations are, for example, carried by an application wheel that can rotate and that moves the containers in a positive way between an entry point and an exit point, with the application stations applying the barrier layer on the containers during this movement.

As a variant or in addition, the treatment unit 34 or another treatment unit can be a unit for cleaning containers that is arranged to inject a cleaning product into the containers.

For reasons of simplicity and to facilitate the reading of the figure, only a treatment unit 34 that comprises five treatment stations 36 has been shown in FIG. 1. It is understood, however, that several treatment units 34, comprising a different number of treatment stations, can be provided.

The filling machine 10 comprises a number of filling stations 40 that are each arranged for receiving and filling a container 2 from the series of containers 2. For this purpose, each filling station 40 comprises a support for a container 42 and a device for filling the container. The filling device is arranged to introduce a filler product into the inner volume of the container 2 via the upper opening of the latter. The filler product is, for example, a liquid, which can be more or less viscous, carbonated or not, and can comprise solid pieces. The filler product may be cooled to ambient temperature or to a warm temperature.

Each filling station 40 is identified, i.e., it is referenced in the control console 27 of the facility. Thus, by way of example, the filling machine 10 comprises 120 filling stations 40. For reasons of simplicity and to facilitate the reading of the figure, only five filling stations 40A, 40B, 40C, 40D and 40E. The filling stations 40 are carried by a filling wheel 44, or carrousel that can rotate around an axis of rotation that is parallel to the axes of rotation of the transfer wheels 22. The filling stations 40 are carried on the periphery of the filling wheel 44 in such a way that they move along a circular path that is defined by the filling wheel 44 between an entry point and an exit point. At the entry point and the exit point, the filling device is placed opposite the inner volume of the container 2, and the filler product is introduced into the container during the movement from the filling station. At the exit point, the filled container is extracted from the filling station 40. The structure and the operation of such filling stations 40 and, more generally, of the filling machine 10 are known as such and will not be described in more detail here.

It should be noted that in the filling machine 10, the transport device 12 is formed by the filling wheel 44 and the container supports 42 themselves that transport the containers from the entry point to the exit point. The filling wheel 44 is thus driven in such a way as to know the position of the filling stations 40 at any moment, for example by driving the filling wheel 44 by means of a synchronous motor. Consequently, the facility makes it possible to know in which filling station a container 2 is placed and filled. The control console 27 thus records into which filling station 40A, 40B, . . . , 40E a particular container passes.

At the outlet of the filling machine 10, the transport device 12 comprises one or more transfer wheels 22 that transport the containers that are filled to a capping unit 46, comprising a number of capping stations 48 that are driven in rotation by a capping wheel 50, each arranged to apply a cap to the neck 18 of a container 2 from the series of containers. As for the other units and machines of the facility, in the capping unit, the transport device 12 is formed by the capping wheel 50 and the capping stations 48 themselves, and the capping wheel 50 is driven in such a way as to know the position of the capping stations 48 at any moment, for example by driving the capping wheel 50 by means of a synchronous motor. Consequently, the facility makes it possible to know in which capping station a container 2 is placed. The control console 27 thus records into which capping station 50 a particular container passes.

At the outlet of the capping unit 50, the containers 2 are removed from the production facility 1.

The marking device 14 is arranged to apply a marking 52 (FIGS. 2 and 3) on each container 2 from the series of containers. Such a marking can be carried out by printing with ink, by the application of a label, by engraving, etc. The marking device 14 can be placed between the forming machine 8 and the filling machine 10, for example opposite a transfer wheel 22. According to a particular example, the marking device 14 is placed between the unit for applying a barrier layer and the filling machine 10. According to an embodiment, the production facility 1 comprises a unique marking device 14. As a variant, the production facility 1 comprises several marking devices 14, each arranged for marking a portion of the containers, while another portion is marked by another marking device. In any case, each container 2 receives only a unique marking 52 in a particular and unique zone of the container 2. For example, the marking 52 is carried out on a portion of the shoulder 35 of the container 2, as shown in FIG. 2. Such a marking that is unique and produced in a unique zone of the container 2 makes it possible to limit the interactions of the marking device 14 with the wall of the container 2 and thus the risks of damage to the container. The marking zone could be provided other than on the shoulder 35, for example on another portion of the body 33 of the container 2.

The marking 52 comprises a number of pieces of information relative to the routing of the container 2 and the preform from which it is obtained in the production facility 1. Actually, as indicated above, the positive transport device 12 makes it possible to know this routing specifically and more particularly to know through which stations a particular preform and the particular recipient obtained from this preform have passed.

Thus, the marking 52 comprises at least one piece of forming information 54 relative to the identified forming station 24 in which the marked container 2 has been formed and a piece of filling information 56 relative to the identified filling station 40 in which the marked container was filled. The forming information 54 is, for example, a forming station number that indicates by which forming station 24A, . . . , 24E the container has been formed, and the filling information 56 is, for example, a filling station number that indicates by which filling station 40A, . . . , 40E the container has been filled. In FIG. 3, a marking example 52 has been shown, in which the number of the identified forming station 24A, . . . , 24E is 16 and in which the number of the identified filling station 40A, . . . , 40E is 61. If necessary, the marking 52 also comprises at least one piece of treatment information 58 relative to an identified treatment station 36, in which the container 2 has been treated. Thus, the treatment information 58 indicates, for example, the number of the labeling station, of the application station, or of the cleaning station through which the container 2 has passed. In FIG. 3, the number of the identified treatment station 36 is 42. According to an embodiment, the marking 52 comprises as much treatment information 58 as there are treatment units 34 between the forming machine 8 and the filling machine 10. If necessary, the marking also comprises at least one piece of capping information 60 relative to the identified capping station 48 in which a cap has been attached to the marked container 2. The information 60 can advantageously be a schedule number of the production line 1. This number makes possible the unique identification of the production line. Without this number, it is possible (but not very probable) that two bottles comprise the same identification, if they have been produced on two different lines. In the example of FIG. 3, the number of the identified capping station 60 is 062. It should be noted that the marking device 14 is able to mark information relative to stations that the container has not yet passed at the time when the marking is being done. Actually, owing to the positive transport device 12, this information is available at any moment even before the container passes through the station in question owing to the synchronization of the production facility 1 and the different machines and units between it.

The marking 52 also comprises time-stamping information 62 relative to the moment at which the container 2 is marked. The time-stamping information 62 comprises, for example, the calendar date of the day 64 in the year and the calendar date of the year 66 when the production facility was put into service and began producing containers. In the example of FIG. 3, the calendar date of the day 64 is 342 and the calendar date of the year 66 is 05, which means that the container was marked on the $342^{nd}$ day of the fifth year of production of the production facility. The time-stamping information 62 also comprises the hour 68 at which the container 2 is marked. As shown in FIG. 3, the hour 68 is marked within a second. Actually, such precision is adequate to ensure a unique marking of each container, even when the containers have passed through the same stations. Actually, the rotation of a wheel of a machine or a facility unit lasts for approximately one second between the entry point and the exit point of this wheel. Thus, two containers 2 cannot pass into the same station within a single second.

An alternative to the unique identification of the bottle by information relative to the stations for transforming the container and to time-stamping is a chronology number, combined with a database that allows the relationship between the unique identification and the information relative to the stations for transforming the container.

The varying marked items of information can be picked up from the control console 27.

According to an embodiment, the marking 52 can also comprise one or more pieces of information regarding product 70, relative to the filling product that is introduced into the container 2. In the example of FIG. 3, the information regarding product 70 is an expiration date of the filler product.

The varying marked items of information on the product are placed adjacent to one another, as shown in FIG. 3, in such a way as to limit the size of the zone in which the marking is carried out.

The marking indicated above therefore makes it possible to identify in a unique way each container 2 of the series of containers 2 as well as to ensure a complete traceability of the container in the facility. Such a traceability makes it possible to identify the possible sources of malfunctions in the facility even when a fault on a container is noted when this container is no longer in the production facility. In addition, the time-stamping information makes it possible to link the information that is relative to the stations under conditions in which the production facility was operating at the time of the production of a container (for example, the temperature in the production facility). In addition, as indicated above, the unique identification and the traceability of each container makes it possible to make the connection between tests that are carried out "on line," i.e., in the production facility during the path of the container into the different stations, for example carried out by adequate sensors, and tests that are carried out "off line," i.e., outside of the production line of the containers 2.

According to a variant, the marking that matches the container can be a QR code or a data matrix, as illustrated in FIGS. 4*a*, 4*b*. This makes it possible to record a large quantity of data in a compact manner. This information then can be read directly on the container, without having to resort to the machine database.

The invention is particularly advantageous when it is applied to a production facility in which the synchronization of machines and units is carried out in such a way that the stations of these machines and units are said to be "paired." Such a pairing, known in the art, makes it possible to operate the stations together in such a way that containers that pass through a particular forming station 24 of the forming machine 8 always pass through the same stations downstream from the forming machine 8. If, for example, a container is formed by the forming station 24A, this container will be filled by the filling station 40A. Another container that is formed by the forming station 24A will also be filled by the filling station 40A. The same is true for the container treatment stations that will always be the same for the containers that are formed by the same forming station 24. In other words, the containers that are formed by a forming station 24 will always have the same path in the production facility. Thus, the marked information relative to forming 54, filling 56, and treatment 58 will be the same for the containers that have passed through the same forming station 24, and the marking of these containers differs only by the time-stamping information 62. The marking is therefore simplified, and the path that is followed by a container in the production facility is identified very quickly, which simplifies the detection of possible malfunctions over this path.

According to a variant, it is possible to equip the facility with several marking units. In particular, it is possible to have the main marking station 14, as described above, and a peripheral marking unit series, at at least one or at several or at all of the locations where containers are removed from the facility outside of the normal production path. Thus, an additional codification can be added that are ejected from the production for a different reason: ejection of the container following a production fault; ejection of the container in the event of an immediate stopping of production; ejection of containers remaining in the conveying zones, in the restarting of the production line, or else sampling of the containers for control.

All of these ejected containers are found in the same recovery tank. According to the reason for the ejection of the article, an additional code is added just before the exit of the bottle from the normal path of the production.

A first advantage of this additional codification is to make possible a manual sorting of the containers in the ejection tank, typically the separation of the sampled containers for control and the ejected containers for production fault.

A second advantage is that the recycling information keeps bad containers from being in the production circuit. The fault code that is added to the bottle indicates the attempts to put a non-compliant product into circulation.

The invention claimed is:

1. A method for producing a series of individual containers (2) from a series of preforms (4)

made of plastic materials that are heated in a container production facility (1) that comprises at least one heating station (6) for heating the series of preforms (4), a forming machine (8) that comprises a plurality of forming stations (24), one or more treatment machines (34) that each comprise a plurality of treatment stations (36), with the method comprising the following steps:

circulating the series of preforms (2) in the at least one heating station (6) up to the forming machine during which each preform (4) is held individually and heated at a reference temperature, forming of the series of preforms (4) in the forming machine (8), each heated preform (4) being placed in one of the plurality of forming stations (24) in which said preform (4) is formed into a container (2), in such a way that said series of preforms (4) is formed into the series of individual containers (2) by following a known path in which each heated preform passes from a particular heating station of the at least one heating station to a particular forming station of the plurality of forming stations, treating the series of individual containers (2) in the one or more treatment machines (34, 10, 46), with each individual container (2) being placed in one of the plurality of treatment stations (36, 40, 48), wherein each treatment station is associated with the particular forming station circulating each container that is held individually between the forming machine and the one or more treatment machine(s); and wherein the method further comprises a phase for individual identification of each container that is produced during a predetermined tracking period, the individual identification phase comprising a marking step during which each individual container (2) that is produced during said tracking period receives a marking that matches said container after passage through at least the particular forming station, to allow individual identification of said container by distinguishing said container from all of the other containers produced by the production facility during said tracking period by identifying, via the marking, a particular path that each individual container has taken or is supposed to take from the particular heating station to the particular forming station to the particular treatment station, and wherein the marking that matches the container that is to be identified comprises station information relative to at least one specific element that has held, or is supposed to hold, said container that is to be identified during the production of the container that is to be identified, and time-stamping information (62) relative to the time when said container (2) that is to be identified is marked.

2. The method according to claim 1, wherein the marking received by each individual container comprises station information relative to at least one specific element that each individual container has not yet passed.

3. The method according to claim 2, wherein the time-stamping information (62) comprises a date and an hour (68) within the second at which the marking (52) of the container (2) takes place, and wherein two containers cannot take the same particular path within the same second.

4. The method according to claim 1, wherein the marking that matches the container that is to be identified comprises a chronology number of the production of the container during the tracking period.

5. The method according to claim 1, wherein the marking that matches the container that is to be identified also comprises a coding that matches the facility that has produced said container and/or a coding of the tracking period.

6. The method according to claim 1, comprising a step for applying a barrier layer to the series of containers (2), with one of said treatment machines being a machine (34) for application of said barrier layer onto an inner wall of the container (2) that comprises a number of application stations (36), with each container (2) being placed in an identified application station (36) in which a barrier layer is applied onto the inner wall of said container, the step for marking the container (2) that is to be identified comprising the marking (52) of a piece of information (58) relative to the identified application station in which a barrier layer has been or will be applied to said container.

7. The method according to claim 6, comprising another treatment step that is a step for filling each container that is produced, with one of the corresponding treatment machines being a filling machine, the step for marking the container that is to be identified taking place between the step for applying a barrier layer and the filling step.

8. The method according to claim 7, wherein the facility that comprises a capping unit (46) that comprises a number of capping stations (48); method in which, during the step for capping the series of containers (2), each container (2) is placed in an identified capping station (48) in which a cap is attached to said container (2), with the step for marking the container (2) that is to be identified comprising the marking (52) of a piece of information (60) relative to the identified capping station (48) in which a cap has been attached to said container (2).

9. The method according to claim 7, in which the marking step comprises the marking (52) of a piece of product information (70) pertaining to a filler product that is introduced into the container (2) during the filling step.

10. The method according to claim 1, in which the production facility comprises a labeling unit that has a number of labeling stations; method in which, during a labeling step, each container (2) is placed in an identified labeling station in which a label is attached to said container, with the step for marking the container that is to be identified comprising the marking (52) of a piece of information (58) relative to the identified labeling station in which a label has been attached to said container.

11. The method according to claim 1, in which the marking (52) of each container (2) is carried out in a unique zone of said container (2), with information (54, 58, 56, 60, 62) relative to identified stations and time-stamping being placed adjacent to one another in said unique zone.

12. The method according to claim 2, in which the marking that matches the container that is to be identified also comprises a coding that matches the facility that has produced said container and/or a coding of the tracking period.

13. The method according to claim 3, in which the marking that matches the container that is to be identified also comprises a coding that matches the facility that has produced said container and/or a coding of the tracking period.

14. The method according to claim 4, in which the marking that matches the container that is to be identified also comprises a coding that matches the facility that has produced said container and/or a coding of the tracking period.

15. A method in a production facility for controlling a series of containers (2) from a series of preforms (4) made of plastic materials, the method comprising:

a first step of machine data acquisition implementing the method according to claim 1, in which for each individual container that is produced, a control console records, the marking that matches said container and a series of specific data relative to the forming and/or treatment stations and/or relative to elements that have held said container during its production, and/or a series of general data relative to the operation of the facility during the production of said container, and wherein each individual container follows a known path in which each heated preform passes from a particular heating station to a particular forming station and one or more particular treatment stations;

a second step of container data acquisition, during which one or more physical values of each of the individually identified containers is/are measured during the first step; and a third step of compiling a mixed database that matches, for each individually identified container during the first step the measurement(s) of the second step, and the series of data acquired during the first step.

16. The method according to claim 15, comprising a diagnostic step, during which the container data are compared in relation to pre-set target values that correspond to the measured values, and a detected or imminent malfunction at one or more of the forming and/or treatment stations and/or holding elements of the facility is determined.

17. The method according to claim 15, comprising a step for analysis of the mixed database, during which at least one law of correlation between the container data and the machine data is established, and a correction step in which according to correlation law(s), one or more likely adjusted machine parameters are calculated during the next production cycle for producing containers, one or more physical values of which will be closer to the pre-set target values than during the first step.

18. A facility (1) for production of a series of containers (2) from a series of preforms (4) made of heated plastic materials making it possible to implement a production method according to claim 2, with said facility comprising:

a station (6) for heating the series of preforms (4) making it possible to hold and to heat each of said preforms (4) at a reference temperature, a machine (8) for forming the series of preforms (4) into a series of containers (2), with said forming machine (8) comprising a number of identified forming stations (24), each forming station (24) receiving a preform (4) and forming said preform into a container (2), at least one machine (34) for treatment of the series of containers (2), with said treatment machine (34) comprising a number of stations (36) for treatment of the container that is produced, a positive transport device (12) that holds each container individually between the forming machine (8) and the treatment machine(s) (34, 10, 46), a marking unit (14) that applies a marking (52) to each of the containers (2) of the series of containers, and a control console (27) that is connected to the marking unit (14) and that generates the marking that is to be applied, with said production facility (1) being wherein the control console comprises software that is designed so that said marking (52) matches said container and makes it possible to identify individually each container that is produced during a predetermined tracking period by distinguishing it from all of the other containers that are produced by the production facility during said tracking period.

19. The facility according to claim 18, wherein each preform that circulates in the heating station is held by a gripping element;

wherein each individual container during forming is held by the forming station (24) that forms it; each individual container in the course of treatment is held by the treatment station (36) that treats it;

wherein each individual container that circulates between the forming machine and the treatment machine(s) is held by an element for gripping the positive transport device (12); and wherein said gripping elements, the forming station or the station for treatment of the or each treatment machine constitute elements that have held, or that should hold, the container that is to be identified, on which information is recorded in the control console that is associated with the marking that matches the container that is to be identified.

20. The facility according to claim 18, in which one of the treatment machines is a machine for filling the container that is produced by the facility, with the filling machine (10) comprising a number of filling stations (40), and in which each filling station (40) of the filling machine (10) is combined with an identified forming station (24) of the forming machine (8) in such a way that for each filling station (40), the control console knows from which forming station (24) the container that the filling station being filled systematically comes.

* * * * *